UNITED STATES PATENT OFFICE.

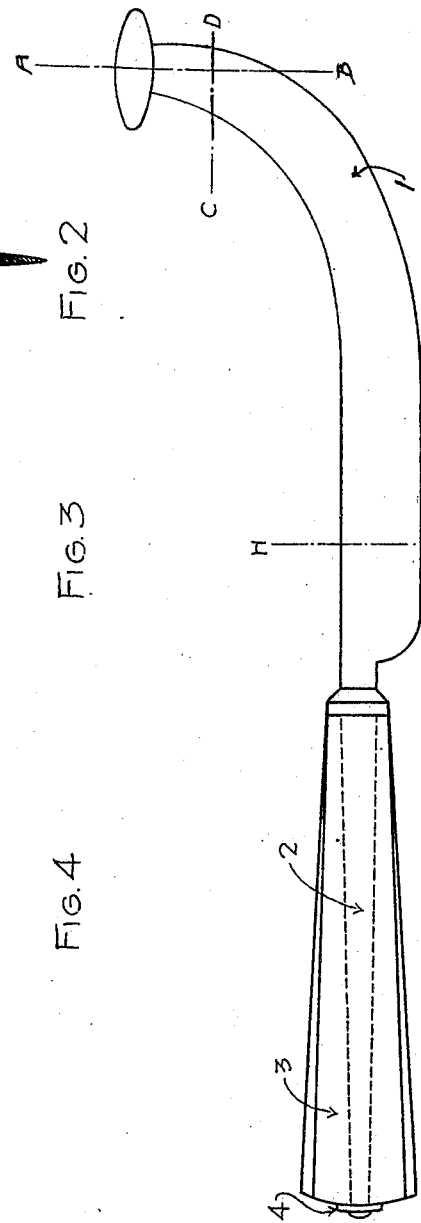

REGIS LEFEBVRE, OF TUPPER LAKE, NEW YORK.

PARTING-KNIFE.

1,397,691. Specification of Letters Patent. Patented Nov. 22, 1921.

Application filed April 30, 1921. Serial No. 465,663.

*To all whom it may concern:*

Be it known that I, REGIS LEFEBVRE, a subject of the King of Great Britain, residing in the town of Tupper Lake, in the State of New York, of the United States, have invented certain new and useful Improvements in Parting-Knives, of which the following is a specification.

My invention relates to parting knives adaptable to skinning and to the separating of various layers of flesh such as practised in surgery.

The object of my invention is to expedite such operations and perform them with absolute security.

In the drawing:

Figure 1 is a side elevation of the complete knife.

Fig. 2 is a section on line A—B of Fig. 1.

Fig. 3 is a section on line C—D of Fig. 1.

Fig. 4 is a section on line E—H of Fig. 1.

The knife consists of a blade having the usual handle piece 2 onto which is mounted a handle 3 retained in place by a washer 4 upon which the end of the piece 2 is riveted.

The blade 1 forms a curve at the end as shown and terminates with an ellipsoid. The curved part 1 of the blade is double edged as clearly shown in Fig. 3.

The mode of operation is as follows: Having practised a small opening in the parts to be separated, the ellipsoid part of the knife is inserted therein, the knife may be either pushed or drawn to sever the parts without fear of cutting deeper than first intended.

In the operation of skinning animals, a cut is made in the skin with the round edge of the knife and the ellipsoid is inserted between the skin and the flesh when the knife may be either drawn and pushed without raising the skin with the fingers as necessary when skinning with the ordinary butcher's knife.

Besides being of great advantage in parting the skin this knife will also serve to separate the skin from the flesh by using the curved edge of the blade.

What I claim is:—

1. In a parting knife, a blade having an edged straight portion, a double-edged curved portion, and a guide formed integral with the end of the curved portion.

2. In a parting knife having a single edge straight portion, a double edged curved portion and an integral ellipsoidal guide forming the end of the curved portion.

REGIS LEFEBVRE.

In the presence of—
G. CARON,
M. GRIMES.